(12) United States Patent
Moutafov

(10) Patent No.: US 7,685,287 B2
(45) Date of Patent: Mar. 23, 2010

(54) METHOD AND SYSTEM FOR LAYERING AN INFINITE REQUEST/REPLY DATA STREAM ON FINITE, UNIDIRECTIONAL, TIME-LIMITED TRANSPORTS

(75) Inventor: Kamen K. Moutafov, Bellevue, WA (US)

(73) Assignee: Microsoft Corporation, Redmond, WA (US)

( * ) Notice: Subject to any disclaimer, the term of this patent is extended or adjusted under 35 U.S.C. 154(b) by 1281 days.

(21) Appl. No.: 10/158,239

(22) Filed: May 30, 2002

(65) Prior Publication Data

US 2003/0225889 A1 Dec. 4, 2003

(51) Int. Cl.
G06F 15/16 (2006.01)
(52) U.S. Cl. .................. 709/227; 709/201; 709/203; 709/217; 709/230
(58) Field of Classification Search .......... 709/227, 709/201, 203, 217, 230, 237, 238; 370/351; 718/1
See application file for complete search history.

(56) References Cited

U.S. PATENT DOCUMENTS

| | | | |
|---|---|---|---|
| 5,247,676 A | 9/1993 | Ozur | |
| 5,548,723 A | 8/1996 | Pettus | |
| 5,706,349 A | 1/1998 | Aditham | |
| 5,724,588 A | 3/1998 | Hill | |
| 5,764,887 A | 6/1998 | Kells | |
| 5,848,234 A | 12/1998 | Chernick | |
| 5,857,191 A | 1/1999 | Blackwell, Jr. et al. | |
| 5,864,665 A | 1/1999 | Tran | |
| 5,881,230 A | 3/1999 | Christensen et al. | |
| 5,884,025 A | 3/1999 | Baehr et al. | |
| 6,052,710 A | 4/2000 | Saliba et al. | |
| 6,104,716 A * | 8/2000 | Crichton et al. | 370/401 |
| 6,119,165 A * | 9/2000 | Li et al. | 709/229 |
| 6,134,680 A | 10/2000 | Yeomans | |
| 6,169,992 B1 | 1/2001 | Beall et al. | |
| 6,185,221 B1 * | 2/2001 | Aybay | 370/412 |
| 6,208,640 B1 * | 3/2001 | Spell et al. | 370/358 |
| 6,374,359 B1 * | 4/2002 | Shrader et al. | 726/5 |

(Continued)

OTHER PUBLICATIONS

Knobbe, Roger; Purtell, Andrew; Schwab, Stephen; "Advanced Security Proxies: An Architecture and Implementation for High-Performance Network Firewalls," 1999, [6 pages].

(Continued)

Primary Examiner—Kenny S Lin
Assistant Examiner—Lan-Dai T Truong
(74) Attorney, Agent, or Firm—Merchant & Gould P.C.

(57) ABSTRACT

An improved method and system for layering RPC communications on top of an HTTP transport. An RPC data stream of individual request/reply packets is mapped to HTTP primitives, and RPC requests are mapped to one large, HTTP, POST-like request (IN channel). Corresponding replies are mapped to another large, HTTP, GET-like request (OUT channel). The client establishes the IN channel and OUT channel as simultaneously open connections with a large content-length for each. Before the content-length is exhausted, the client and server open a new IN or OUT channel while the corresponding channel is still alive, so that there is always at least one opened IN or OUT channel available. If traffic is too infrequent, the client keeps the connection alive so that it will not be closed for being idle. This provides a bi-directional virtual connection that remains open for an unlimited time for tunneling unlimited amounts of RPC traffic.

22 Claims, 9 Drawing Sheets

U.S. PATENT DOCUMENTS

| | | | |
|---|---|---|---|
| 6,598,167 B2 | 7/2003 | Devine et al. | |
| 6,633,878 B1* | 10/2003 | Underwood | 707/100 |
| 6,704,873 B1* | 3/2004 | Underwood | 726/12 |
| 6,714,795 B1* | 3/2004 | Long et al. | 455/518 |
| 6,731,625 B1* | 5/2004 | Eastep et al. | 370/352 |
| 6,880,089 B1 | 4/2005 | Bommareddy et al. | |
| 6,909,708 B1* | 6/2005 | Krishnaswamy et al. | 370/352 |
| 6,912,715 B2 | 6/2005 | Gao et al. | |
| 6,925,060 B2 | 8/2005 | Mangin | |
| 6,987,732 B2* | 1/2006 | Gracon et al. | 370/235.1 |
| 7,003,571 B1 | 2/2006 | Zombek et al. | |
| 7,028,097 B2 | 4/2006 | Bard | |
| 7,028,312 B1* | 4/2006 | Merrick et al. | 719/330 |
| 7,039,916 B2 | 5/2006 | Jason | |
| 7,058,761 B2* | 6/2006 | Nakamura et al. | 711/114 |
| 7,069,335 B1 | 6/2006 | Layman | |
| 7,225,237 B1* | 5/2007 | Tenereillo | 709/219 |
| 2001/0017844 A1* | 8/2001 | Mangin | 370/231 |
| 2001/0027492 A1* | 10/2001 | Gupta | 709/245 |
| 2001/0046220 A1* | 11/2001 | Koo et al. | 370/335 |
| 2001/0054020 A1* | 12/2001 | Barth et al. | 705/37 |
| 2002/0032751 A1 | 3/2002 | Bharadwaj | |
| 2002/0053029 A1* | 5/2002 | Nakamura et al. | 713/201 |
| 2002/0055966 A1* | 5/2002 | Border et al. | 709/200 |
| 2002/0078371 A1 | 6/2002 | Heilig et al. | |
| 2002/0103954 A1 | 8/2002 | Karamanolis | |
| 2002/0107890 A1* | 8/2002 | Gao et al. | 707/513 |
| 2002/0111158 A1* | 8/2002 | Tee | 455/421 |
| 2002/0156812 A1* | 10/2002 | Krasnoiarov et al. | 707/513 |
| 2003/0005333 A1 | 1/2003 | Noguchi | |
| 2003/0041263 A1* | 2/2003 | Devine et al. | 713/201 |
| 2003/0061356 A1* | 3/2003 | Jason, Jr. | 709/227 |
| 2003/0097448 A1* | 5/2003 | Menezes et al. | 709/227 |
| 2003/0123451 A1* | 7/2003 | Nielsen et al. | 370/395.4 |
| 2003/0126136 A1* | 7/2003 | Omoigui | 707/10 |
| 2003/0145094 A1 | 7/2003 | Staamann | |
| 2003/0177187 A1* | 9/2003 | Levine et al. | 709/205 |
| 2003/0188006 A1* | 10/2003 | Bard | 709/232 |
| 2003/0204645 A1* | 10/2003 | Sharma et al. | 709/328 |
| 2003/0212739 A1* | 11/2003 | Boucher et al. | 709/203 |
| 2003/0225889 A1 | 12/2003 | Moutafov | |
| 2005/0010567 A1* | 1/2005 | Barth et al. | 707/3 |
| 2005/0033858 A1* | 2/2005 | Swildens et al. | 709/232 |
| 2005/0094176 A1* | 5/2005 | Matsuishi | 358/1.13 |
| 2005/0210296 A1* | 9/2005 | Devine et al. | 713/201 |
| 2005/0216421 A1* | 9/2005 | Barry et al. | 705/64 |

OTHER PUBLICATIONS

Spreitzer, Mike; Janssen, Bill; "HTTP 'Next Generation'," 2000, pp. 593-607.
The Open Group, "DCE 1.1: Remote Procedure Call," C706, Aug. 1997, pp. 1-716.
Internet Assigned Numbers Authority, "Well-Known Port Numbers," [last updated Oct. 4, 2006], [233 pages].
IBM Corporation, "LAN Technical Reference: 802.2 and NetBIOS APIs," May 1996, [585 pages].
Network Working Group, "Protocol Standard for a NetBIOS Service on a TCP/UDP Transport: Concepts and Methods," STD 19, RFC 10021001, Mar. 1987, [64 pages].
Network Working Group, "Protocol Standard for a NetBIOS Service on a TCP/UDP Transport: Detailed Specifications," STD 19, RFC 1002, Mar. 1987, [80 pages].
Mockapetris, P., "Domain Names—Concepts and Facilities," Nov. 1987, [49 pages].
Internet Engineering Task Force, "Requirements for Internet Hosts—Application and Support,"Oct. 1989, [92 pages].
Fielding, R.; Gettys, J.; Mogul, J.; Frystyk, H.; Masinter, L.; Leach, P.; Berners-Lee, T.; "Hypertext Transfer Protocol—HTTP/1.1," RFC 2616, Obsoletes 2068, Jun. 1999, [6 pages].
Franks, J; Hallam-Baker, P.; Hostetler, J.; Lawrence, S.; Leach, P.; Luotonen, A.; Stewart, L.; "HTTP Authentication: Basic and Digest Access Authentication," RFC 2617, Obsoletes 2069, Jun. 1999, [31 pages].
Rescorla, E., "HTTP Over TLS," RFC 2818, May 2000, [7 pages].
Bradner, S., "Key words for use in RFCs to Indicate Requirement Levels," BCP 14, RFC 2119, Mar. 1997 [3 pages].
Hinden, R.; Deering, S., "Internet Protocol Version 6 (IPv6) Addressing Architecture," RFC 3513, Obsoletes 2373, Apr. 2003, [24 pages].
Ananda, A.L., Tay, B.H., Koh, E.K., *Astra—An Asynchronous Remote Procedure Call Facility*, IEEE, The 11th International Conference on Distributed Computing Systems, May 20-24, 1991.
Black, U., *Computer Networks Protocols, Standards, and Interfaces*, Prentice-Hall, Inc., ISBN 0-13-175605-2, © 1993.
Eisler, M., Schemers III, R., Srinivasan, R., *Security Mechanism Independence in ONC RPC* [online], Sixth USENIX Security Symposium, pp. 51-66 of the Proceedings, Jul. 22-25, 1996, [Retreived Dec. 26, 2007], Retrieved from: http://www.usenix.org/publications/library/proceedings/sec96/full_papers/eisler/.
Fielding, R., Gettys, J., Mogul, J., Frystyk, H., Berners-Lee, T., *Hypertext Transfer Protocol—HTTP/1.1*, RFC 2068, Jan. 1997.
Huang, Y., Ravishankar, C., *Designing an Agent Synthesis System for Cross-RPC Communication* [online], IEEE Transactions on Software Engineering, vol. 20, No. 3, Mar. 1994, [Retreived Dec. 26, 2007], Retrieved from: http://www.cs.ucr.edu/~ravi/Papers/Jrnl/cross-rpc.pdf.
Levy, H., Tempero, W., *Modules, Objects and Distributed Programming, Issues in RPC and Remote Object Invocation*, Software- Practice and Experience, vol. 21(1), pp. 77-90, Jan. 1991.
Linksys PAP2 (No Document).
Nakada, H., Matsuoka, S., Seymour, K., Dongarra, J., Lee, C., Casanova, H., *GridRPC: A Remote Procedure Call API for Grid Computing*, Jun. 7, 2002.
SOAP (No Document).
*Towards Distributed Systems in Ada 9X*, Proceedings of the Tri-Ada '92 Conference for Industry, Academia, and Government, Nov. 16-20, 1992.
Wilde, E., *Protocol Considerations for Web Linkbase Access*, Sill Federal Institute of Technology, TIK Report 143, Jul. 2002.
XML RPC, [Retrieved Dec. 26, 2007], Retrieved from: http://www.xmlrpc.com/.
Xu, J., Singhal, M., *Logical Firewalls: A Mechanism for Security in Future Networking Environments*, Nov. 26, 1996.
"MS81: MQSeries internet pass-thru Version 1.0," MQSeries Development, IBM United Kingdom Laboratories, Jun. 2000, [38 pages].
Berners-Lee, T., et al. "Hypertext Transfer Protocl —HTTP/1.0," RFC 1945, May 1996.
White, James. "High-Level Framework for Network-Based Resource Sharing," RFC 707, Jan. 14, 1976.

* cited by examiner

METHOD AND SYSTEM FOR LAYERING AN INFINITE REQUEST/REPLY DATA STREAM ON FINITE, UNIDIRECTIONAL, TIME-LIMITED TRANSPORTS

FIELD OF THE INVENTION

The present invention relates generally to communicating information over computer networks, and more particularly to a method, system and protocol for communicating data streams over limited communication infrastructures such as HTTP (HyperText Transfer Protocol).

BACKGROUND OF THE INVENTION

Many network computer users want access to their corporate network or the like through the Internet. In order to access such a network, the concept of tunneling is used. In general, tunneling encapsulates one protocol within another protocol that is supported over the Internet, e.g., HTTP, such that the encapsulating protocol appears as ordinary data, whereby the encapsulated protocol (that by itself is unsupported) is allowed to pass through proxies, firewalls and so forth.

One protocol that is desirable to encapsulate within HTTP is Remote Procedure Call (RPC). RPC generally refers to a protocol that allows a program running on one networked computer to have a procedure executed therefor on another networked computer, e.g., a remote procedure call is initiated by a client caller and received at a remote server, which then executes a procedure based on data in the call and returns a result to the client caller. As can be appreciated, RPC provides a number of benefits in networked computing.

In order to encapsulate RPC within HTTP, e.g., so that applications and the like can use RPC whether a client computer is directly (actually through a proxy) connected to the corporate network or is connected through the Internet, contemporary operating systems map RPC data streams on top of HTTP primitives. This mapping suffers from a number of severe limitations.

By way of background, conventional mapping maps the RPC data stream on top of a pseudo-SSL (Secure Sockets Layer)-encrypted HTTP data stream, where the data stream is declared to be SSL encrypted, but actually is not. This is done so that HTTP proxies do not look into the data, since they assume that it is encrypted. Note that the RPC Proxy uses the same HTTP request to send all of its requests/replies, which is in direct violation of the HTTP standards. Also, the HTTP data stream is directed to port 80, the defined standard port for conventional HTTP communication, even though the standard port defined for SSL is port 443. This is because SSL is verified on port 443, i.e., true SSL is required or the proxy does not allow the data stream.

This method of mapping suffers from several major limitations and/or problems. One limitation is that the method requires SSL tunnelling to be enabled on port 80 of the HTTP Proxy, for reasons described above. However, the vast majority of proxies that are available do not enable this by default, and most network administrators are very reluctant to enable it, especially the Internet Service Provides (ISPs) to which many users subscribe. However, unless enabled, the conventional RPC to HTTP mapping method is not deployable, which is the situation in most environments.

Another problem is that the conventional method of mapping assumes that the Web Server will allow an infinite amount of bi-directional traffic (requests and replies) to be mapped to the same HTTP request. This is no longer the case with contemporary Internet severs, (e.g., Microsoft Corporation's IIS6.0 product), and consequently the conventional mapping method simply does not work with such servers.

Yet another significant problem with the conventional mapping method is that most elements of the HTTP infrastructure do not allow idle connections to stay open for a long time. However, RPC allows any amount of time between making RPC Requests on the same binding handle. As a result, RPC usage patterns in which there is a significant delay between requests are rejected by the underlying HTTP infrastructure, resulting in application errors.

In sum, HTTP has a number of limitations including its finite, unidirectional and time-limited qualities, which do not match up with the requirements of RPC and/or other protocols having data streams that need bidirectional communication over essentially unlimited sizes and with essentially unlimited connection times. At the same time, transporting RPC and other data streams over HTTP would be highly desirable to meet the needs of many computer users.

SUMMARY OF THE INVENTION

Briefly, the present invention provides a method and system for mapping infinite request/reply data streams on finite, unidirectional and time-limited request/replies. The method and system enable layering RPC data communications on top of an HTTP transport.

A client establishes two connections to a server, one an IN channel for sending data to the server, and one an OUT channel for receiving data from the server. The connections (e.g., HTTP) have limited lifetimes with respect to the amount of data they can transfer, and are typically through corresponding IN channel and OUT channel proxies.

In one implementation, an RPC data stream of individual request/reply packets is mapped to HTTP primitives, and RPC requests are mapped to a single large, HTTP, POST-like request, that is, the IN channel. Corresponding replies are mapped to another large, HTTP, GET-like request, that is, the OUT channel. The client establishes and maintains the IN channel and OUT channel as simultaneously open connections with a large content-length for each.

The lifetimes of the connections are tracked with respect to the amount of data that is transferred on them. Before the connection expires, that is, before the established content-length is exhausted, the client and server open a new IN or OUT channel while the corresponding old IN or OUT channel is still alive. This provides a virtual bidirectional channel of at least one opened IN channel and at least one opened OUT channel that is always available and never expires, which fits the needs of RPC. Further, to avoid the possibility of a connection being determined to be idle and thus dropped, the client and server send pings when necessary, such as after an idle period that is safely shorter than the idle time in which the HTTP infrastructure (e.g., HTTP proxies) drop connections.

The system and method thus provide a bi-directional virtual connection that can carry an unlimited amount of data and remains open for an unlimited time from the perspective of RPC traffic.

Other advantages will become apparent from the following detailed description when taken in conjunction with the drawings, in which:

DETAILED DESCRIPTION

Exemplary Operating Environment

Figure 1:
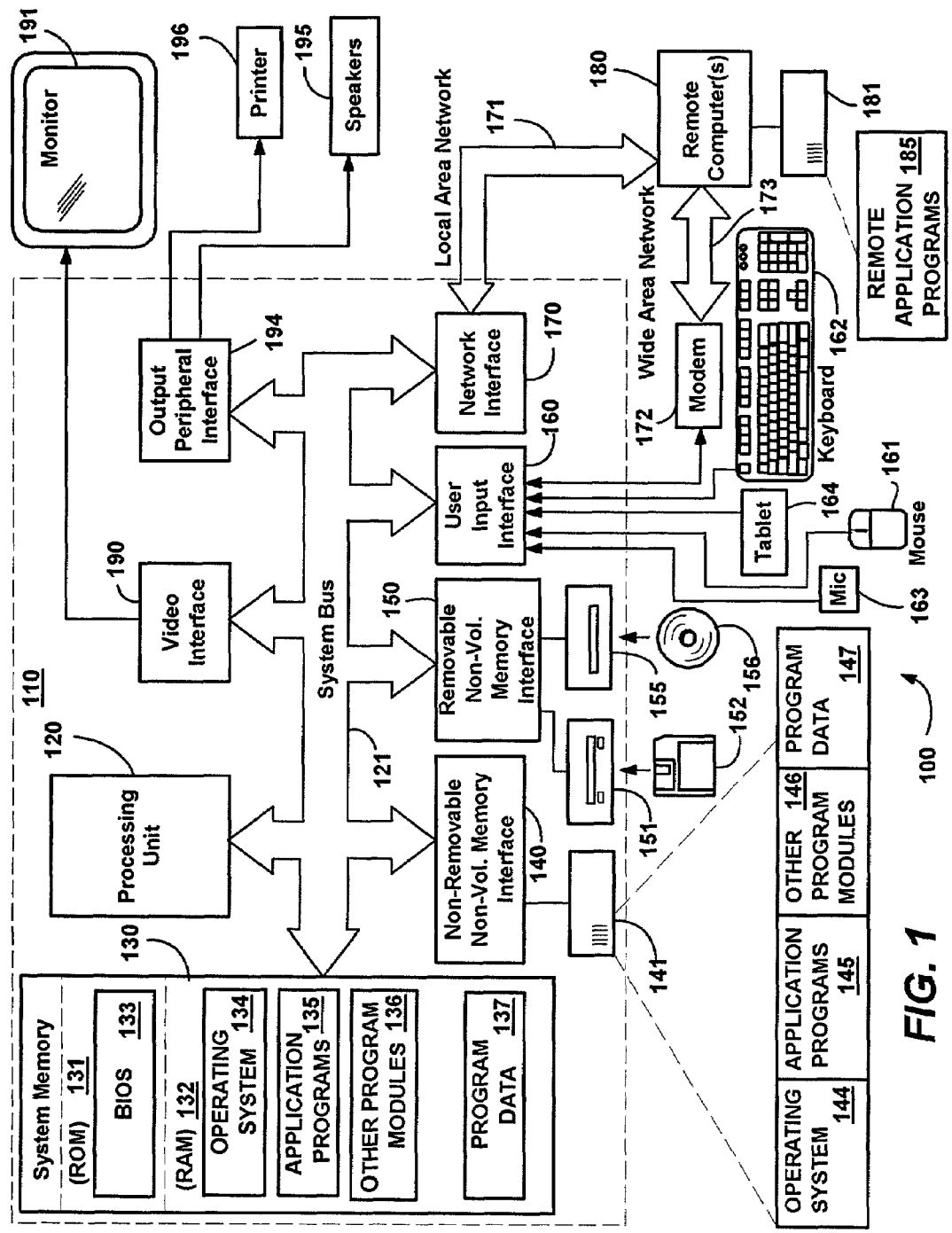
FIG. 1 is a block diagram representing one exemplary computing environment into which the present invention may be incorporated.

FIG. 1 illustrates an example of a suitable computing system environment 100 on which the invention may be implemented. The computing system environment 100 is only one example of a suitable computing environment and is not intended to suggest any limitation as to the scope of use or functionality of the invention. Neither should the computing environment 100 be interpreted as having any dependency or requirement relating to any one or combination of components illustrated in the exemplary operating environment 100.

The invention is operational with numerous other general purpose or special purpose computing system environments or configurations. Examples of well known computing systems, environments, and/or configurations that may be suitable for use with the invention include, but are not limited to: personal computers, server computers, hand-held or laptop devices, tablet devices, multiprocessor systems, microprocessor-based systems, set top boxes, programmable consumer electronics, network PCs, minicomputers, mainframe computers, distributed computing environments that include any of the above systems or devices, and the like.

The invention may be described in the general context of computer-executable instructions, such as program modules, being executed by a computer. Generally, program modules include routines, programs, objects, components, data structures, and so forth, that perform particular tasks or implement particular abstract data types. The invention may also be practiced in distributed computing environments where tasks are performed by remote processing devices that are linked through a communications network. In a distributed computing environment, program modules may be located in local and/or remote computer storage media including memory storage devices.

With reference to FIG. 1, an exemplary system for implementing the invention includes a general purpose computing device in the form of a computer 110. Components of the computer 110 may include, but are not limited to, a processing unit 120, a system memory 130, and a system bus 121 that couples various system components including the system memory to the processing unit 120. The system bus 121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

The computer 110 typically includes a variety of computer-readable media. Computer-readable media can be any available media that can be accessed by the computer 110 and includes both volatile and nonvolatile media, and removable and non-removable media. By way of example, and not limitation, computer-readable media may comprise computer storage media and communication media. Computer storage media includes both volatile and nonvolatile, removable and non-removable media implemented in any method or technology for storage of information such as computer-readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can accessed by the computer 110. Communication media typically embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer-readable media.

The system memory 130 includes computer storage media in the form of volatile and/or nonvolatile memory such as read only memory (ROM) 131 and random access memory (RAM) 132. A basic input/output system 133 (BIOS), containing the basic routines that help to transfer information between elements within computer 110, such as during start-up, is typically stored in ROM 131. RAM 132 typically contains data and/or program modules that are immediately accessible to and/or presently being operated on by processing unit 120. By way of example, and not limitation, FIG. 1 illustrates operating system 134, application programs 135, other program modules 136 and program data 137.

The computer 110 may also include other removable/non-removable, volatile/nonvolatile computer storage media. By way of example only, FIG. 1 illustrates a hard disk drive 141 that reads from or writes to non-removable, nonvolatile magnetic media, a magnetic disk drive 151 that reads from or writes to a removable, nonvolatile magnetic disk 152, and an optical disk drive 155 that reads from or writes to a removable, nonvolatile optical disk 156 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 141 is typically connected to the system bus 121 through a non-removable memory interface such as interface 140, and magnetic disk drive 151 and optical disk drive 155 are typically connected to the system bus 121 by a removable memory interface, such as interface 150.

The drives and their associated computer storage media, discussed above and illustrated in FIG. 1, provide storage of computer-readable instructions, data structures, program modules and other data for the computer 110. In FIG. 1, for example, hard disk drive 141 is illustrated as storing operating system 144, application programs 145, other program modules 146 and program data 147. Note that these components can either be the same as or different from operating system 134, application programs 135, other program modules 136, and program data 137. Operating system 144, application programs 145, other program modules 146, and program data 147 are given different numbers herein to illustrate that, at a minimum, they are different copies. A user may enter commands and information into the computer 20 through input devices such as a tablet, or electronic digitizer, 164, a microphone 163, a keyboard 162 and pointing device 161, commonly referred to as mouse, trackball or touch pad. Other input devices not shown in FIG. 1 may include a joystick, game pad, satellite dish, scanner, or the like. These and other input devices are often connected to the processing unit 120 through a user input interface 160 that is coupled to the system bus, but may be connected by other interface and bus structures, such as a parallel port, game port or a universal serial bus (USB). A monitor 191 or other type of display device is also connected to the system bus 121 via an interface, such as a video interface 190. The monitor 191 may also be integrated with a touch-screen panel or the like. Note that the monitor and/or touch screen panel can be physically coupled to a housing in which the computing device 110 is incorporated, such as in a tablet-type personal computer. In addition, computers such as the computing device 110 may also include other peripheral output devices such as speakers 195 and printer 196, which may be connected through an output peripheral interface 194 or the like.

The computer 110 may operate in a networked environment using logical connections to one or more remote computers, such as a remote computer 180. The remote computer 180 may be a personal computer, a server, a router, a network PC, a peer device or other common network node, and typically includes many or all of the elements described above relative to the computer 110, although only a memory storage device 181 has been illustrated in FIG. 1. The logical connections depicted in FIG. 1 include a local area network (LAN) 171 and a wide area network (WAN) 173, but may also include other networks. Such networking environments are commonplace in offices, enterprise-wide computer networks, intranets and the Internet. For example, in the present invention, the computer system 110 may comprise source machine from which data is being migrated, and the remote computer 180 may comprise the destination machine. Note however that source and destination machines need not be connected by a network or any other means, but instead, data may be migrated via any media capable of being written by the source platform and read by the destination platform or platforms.

When used in a LAN networking environment, the computer 110 is connected to the LAN 171 through a network interface or adapter 170. When used in a WAN networking environment, the computer 110 typically includes a modem 172 or other means for establishing communications over the WAN 173, such as the Internet. The modem 172, which may be internal or external, may be connected to the system bus 121 via the user input interface 160 or other appropriate mechanism. In a networked environment, program modules depicted relative to the computer 110, or portions thereof, may be stored in the remote memory storage device. By way of example, and not limitation, FIG. 1 illustrates remote application programs 185 as residing on memory device 181. It will be appreciated that the network connections shown are exemplary and other means of establishing a communications link between the computers may be used.

Figure 2:
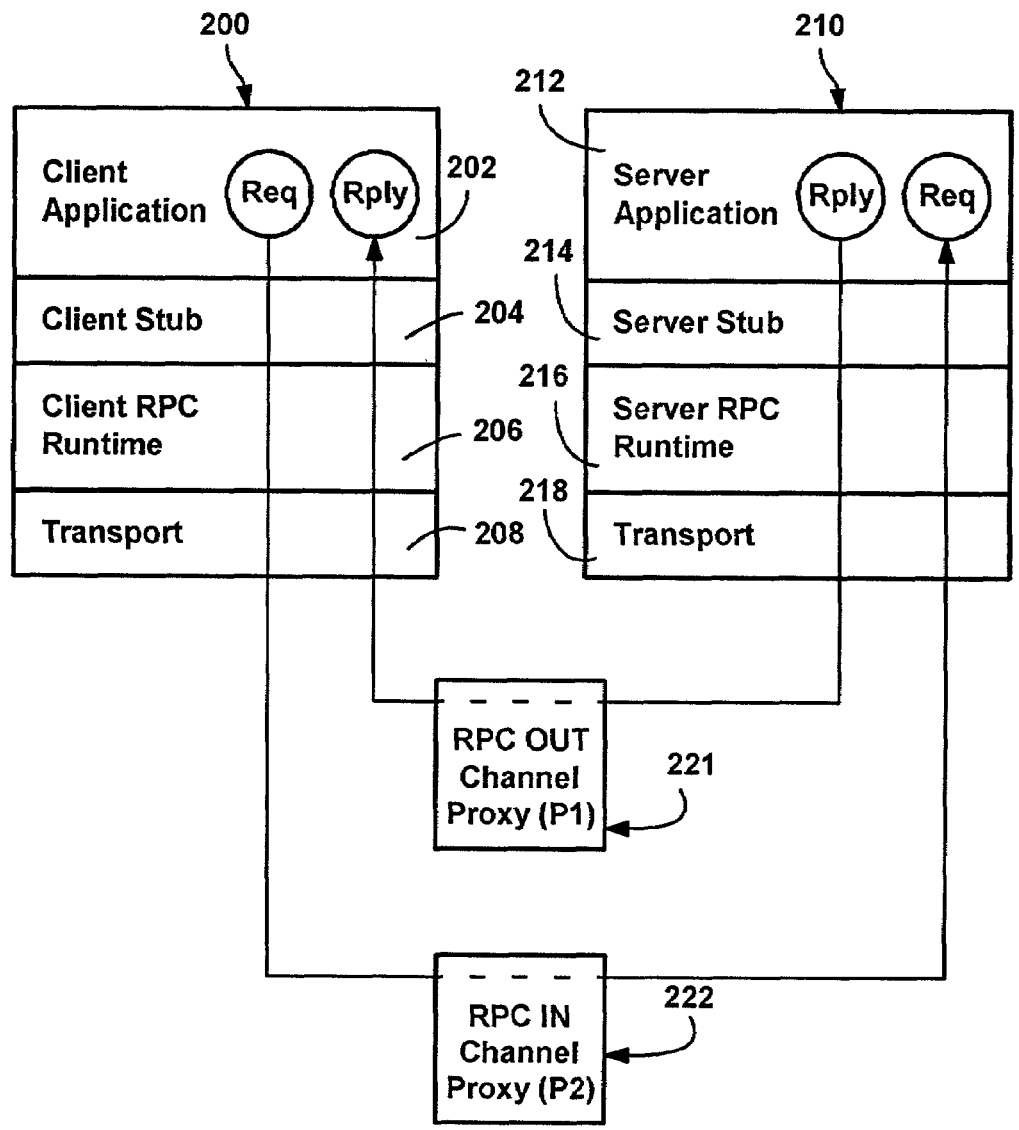
FIG. 2 is a representation of a client communicating with a server over IN and OUT proxies in accordance with an aspect of the present invention.

Mapping Infinite Request/Reply Data Streams on Finite, Unidirectional and Time-Limited Request/Replies FIG. 2 is a general representation of a client 200 communicating with a server 210, exemplifying how an RPC request (REQ) flows from a client application 202 to a server application 212, and a reply (RPLY) is returned from the server application 212 to the client application 202, in accordance with one aspect of the present invention. Client stubs 204 may be compiled and linked with the client application 204, and server stubs 214 may be compiled and linked with the server application 214. Instead of containing the code that implements the procedure called for by the client application, a client stub code retrieves required parameters from a client address space, translates the parameters as needed into a standard NDR (Network Data Representation) format (i.e., marshals the data) for transmission over the network, and calls functions in the RPC client runtime 206 (e.g., a library of functions) to send the request and its parameters over a suitable transport 208 to the server application 212.

Figure 3:
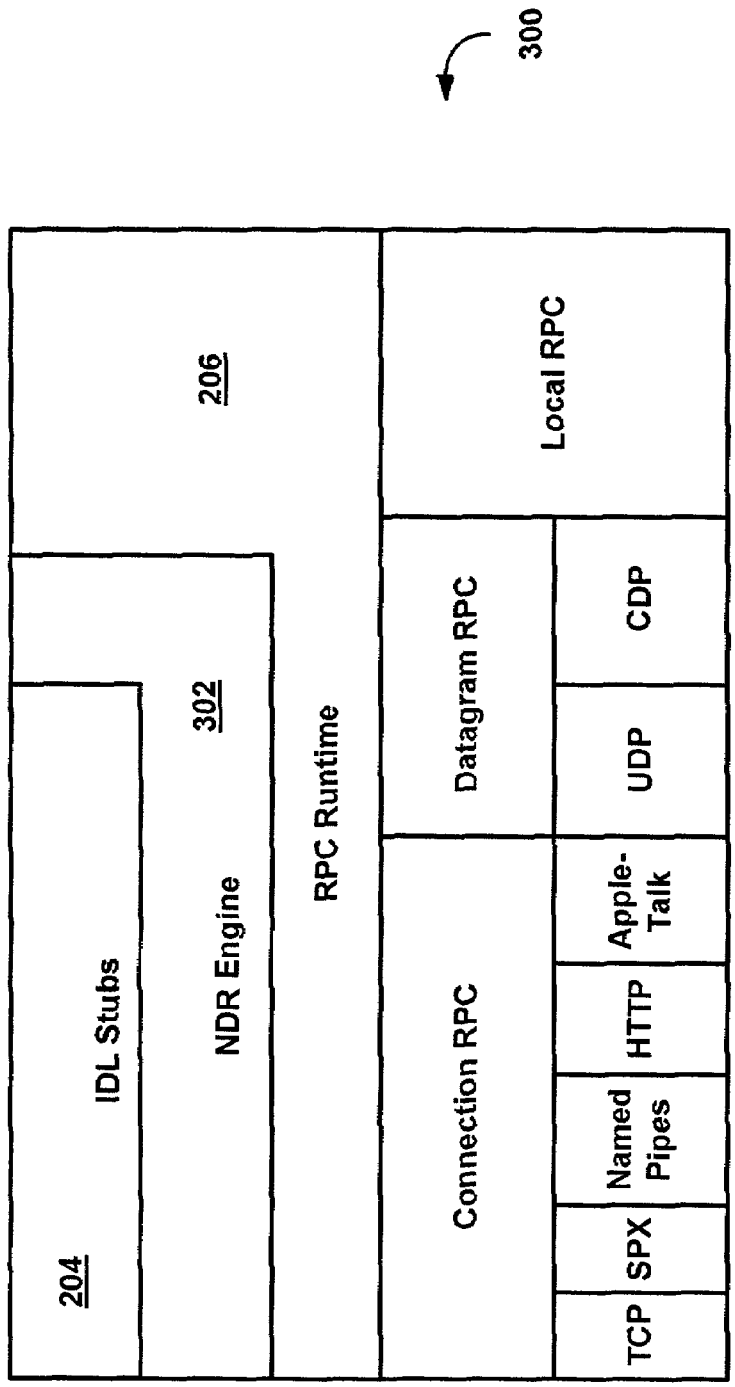
FIG. 3 is a representation of RPC components in an example implementation that benefit from the present invention.

FIG. 3 shows one suitable implementation 300 of the component architecture, such as on the client 200, including the IDL (Interface Definition Language)-compiled stubs 204, the RPC runtime 206 and an NDR engine 302 (not shown in FIG. 2) that marshals the data as appropriate.

Returning to FIG. 2, at the server 210, the remote procedure is called as the server RPC runtime 216 (e.g., library functions) accepts the request that arrived via the transport 218, and calls the server stub procedure 214. The server stub 214 retrieves the parameters from a network buffer, and converts the parameters from the network transmission format to the format that is appropriate for the particular server. The server stub calls the actual procedure on the server application 212.

The remote procedure then runs in the server application 212, resulting (possibly) in output parameters and a return value. When the remote procedure is complete, a similar sequence of steps returns the data to the client, that is, the server application 212 (remote procedure) returns its data to the server stub 214, which in turn converts the output parameters to the format required for transmission over the network, and returns them to the RPC runtime 216, which via the transport 218 transmits the data to the client computer 200 over the network.

The client 200 completes the process by accepting the data and returning it to the calling function, in a manner similar to the way in which the server handled the data it received, that is, the client RPC run-time library receives the remote-procedure return values and returns them to the client stub, which in turn converts the data from its network data representation to the format used by the client computer 200. The stub writes data into the client memory and returns the result to the calling application 202, e.g., by writing the data into an appropriate client memory location. The client application continues as if the procedure had been called on the same computer.

In accordance with one aspect of the present invention and as described below, the client 200 and server 210 (e.g., their respective transport components) establish and maintain at least one IN channel and an OUT channel, via a corresponding OUT channel proxy 221 and IN channel proxy 222, also referred to herein as P1 and P2, respectively (note that P1 and P2 can be the same machine). This is in contrast to conventional RPC, in which the traffic in both directions goes on the same connection. Thus, in the example described herein of RPC over HTTP, two connections are established, namely an IN connection for client-to-server traffic, and the OUT connection for server-to-client traffic. It should be noted that the client, the server and the proxy are each aware of the two separate connections, one in each direction. For example, the RPC proxies 221 and 222 track RPC fragments and know where a fragment starts and ends, enabling them to insert RTS packets (described below) into the data stream safely. Further, since the client, the server and the proxies operate together, they agree on the protocol version, i.e., the version used in a (virtual) connection is the lowest version of the versions of the client, server and any of the proxies. Note that as described below, a proxy can change (channel recycling) when a channel is approaching its expiration, so the client and the server need to be capable of adjust their protocol version on such an event.

As used herein, the terms IN and OUT are from the perspective of the server, e.g., the client-to-server traffic is referred to as IN traffic, while the server-to-client traffic is referred to as OUT traffic. From an HTTP perspective, the IN channel is a (typically) large POST-like request, and the OUT channel is a (typically) large GET-like request, both of which are kept alive over time as necessary. To keep the connections alive, when no RPC traffic occurs for some time, pings are used as substitute for traffic.

To establish the connection, a new type of RPC packet is provided, rpcconn_tunnel_settings, referred to herein as an RTS packet. The format of one suitable RTS packet is described below.

HTTP 1.0 does not support variable sized packets, and because many proxies only support HTTP 1.0, the present invention generally attempts to conform to HTTP 1.0 standards. To this end, the content length is declared in the HTTP request header, and the RPC traffic on the channel is put in the body of the request. Note that the traffic on a given channel cannot exceed the pre-declared content length, which may be referred to as the lifetime of the channel, which is measured in bytes, not in time. Further, note that a minimum supported lifetime is 128 KB, and servers are to reject lifetimes less than that. For brevity, the expiration of the lifetime of the channel may be referred to as channel expiration.

Once the amount of data corresponding to the lifetime has been transmitted, that is, the lifetime has expired, no more data can be sent on the channel. Because of this, each IN and OUT channel is preferably initialized with a very large content length declared in its HTTP header for reasons which will become apparent; e.g., large lifetimes require less frequent reestablishment of new channels (recycling).

More particularly, before a channel expires, a new channel needs to be established, and the old one discarded once it expires. This is called channel recycling, and is transparent to the runtime, as the changes take place in the transport layers. Because recycling is arranged such that new channels are created prior to an old channel expiring, after establishment of a connection, there is always at least one active IN channel and one active OUT channel. The sequence of currently active IN channels forms a virtual IN channel, while the sequence of currently active OUT channels forms a virtual OUT channel. The combination of a virtual in channel and a virtual out channel forms the virtual bidirectional connection that logically never expires (and is never dropped).

It should be noted that because the TCP connection is closed when the channel is recycled, in the absence of other security provisions, the client and the server preferably operate to prevent intruders from hijacking a connection. To this end, a sixteen byte cryptographically strong random number or the like may be used to prevent such hijacking. This number is referred to as a cookie (which should not be confused with web cookies).

As described above, the HTTP infrastructure will time out idle connections. In keeping with the present invention, to provide an unlimited (infinite) connection time, when no RPC traffic has been sent on a respective channel, the sending party sends a small no-op packet to keep the connection alive. This is a called a connection ping, or channel ping. The connection ping is also used to faithfully represent keep-alive semantics through multiple hops.

Typical IIS and corpnet HTTP proxies maintain approximately a fifteen minute connection timeout. Other HTTP proxies may be more aggressive in timing out connections, but it is highly unlikely that they will drop their timeout to less than five minutes, because TCP's congestion avoidance algorithm may easily exceed five minutes. Note that the connection timeout for IIS is configurable and statically discoverable, but not for the proxy. Therefore, to deal with aggressive HTTP proxies, a client side policy reduces the ping interval below that advertised by the server. Note that various tests were unable to discover any ISP proxy having a timing out a connection in less than fifteen minutes.

Another consideration is that HTTP 1.0 does not have provisions for flow control. Because the parties listen for RTS traffic, none of the parties can rely on TCP flow control, whereby end-to-end flow control is required. For the IN traffic, the RPC IN proxy 222 flow controls the client 200, and the server 210 flow controls the IN RPC proxy 222. For the OUT traffic, the RPC OUT proxy 221 flow controls the server 210, and the client flow controls the OUT RPC proxy 221.

To this end, each party that flow controls another maintains a receive window, which it advertises during channel establishment. The receive window functions like a normal receive window, e.g., traffic is allowed to approach the size of the receive window, and the sender is not allowed to send more traffic when the window becomes full. The receiver acknowledges its processing of packets by advertising its current available window size and its last received byte (e.g., the receiver advertises that at byte X, the receiver had a window available of Y). The sender keeps track of how mnay bytes it has sent, and using the receiver information of the Y window size at the X'th byte, gauges its sends. The receiver acknowledges traffic often enough such that the sender does not stall, but not so frequently that the acknowledge results in a lot of unnecessary traffic. The receiver may implement any algorithm for this purpose, preferably one that tends toward the ideal situation in which a receiver would acknowledge received traffic exactly at the point where the sender thinks it has filled all of the receiver's receive window.

When a channel is recycled, the proxy that owns the new channel may or may not be the same proxy that owned the old channel. When the proxy that owns the new channel is not the same proxy that owned the old channel, the new channel proxy advertises its full receive window. The sender is allowed to send data for the full receive window of the new proxy, regardless of whether some of the prior traffic may not have been acknowledged by the old channel proxy. For example, if a proxy receive window on an IN channel is 8K, and a client has sent 2K of traffic that has not been acknowledged (that is, it has 6K to send), and the client recycles the IN channel, the new proxy machine advertises a receive window of 8K and the client is free to send another 8K of data to the new proxy. The old and new proxies work together as generally described below to handle traffic ordering and flow control to the server.

Note that RTS traffic is not subject to flow control, but instead advances to the head of the queue and essentially gets sent immediately. This is acceptable in the system because RTS traffic is rare and is intended to be immediately consumed, and because RTS traffic does not count as occupying space in the receiver's receive window.

Client-to-proxy flow control of the OUT channel is performed through the IN channel, and proxy-to-client flow control of the IN channel is performed through the OUT channel. Server-to-proxy flow control of the IN channel is done on the IN channel socket, while proxy-to-server flow control of the OUT channel is done on the out channel socket. This means that server keeps a posted receive on both the IN and OUT channel sockets, the IN channel proxy keeps a posted receive on the IN channel socket to the server, and the OUT channel proxy keeps a posted receive on the out channel socket to the server. Posting of such receives is described below with reference to FIGS. 4-8; note however, that the described posting of receives are only examples which are not necessary to the invention, and indeed will likely vary among other implementations.

Protocol Primitives

An IN channel is established by sending an HTTP header, as set forth in the table below:

---

Method: RPC_IN_DATA
URI: /rpc/rpcproxy.dll?server_name:server_port
Protocol version: HTTP 1.1
Accept: application/rpc
User-Agent: MSRPC
Host: proxy_server
Content-Length: NNN
Connection: Keep-Alive
Cache-control: no-cache
Pragma: no-cache

---

Note that the proxy only looks at the URL query, method and content length; the other fields are simply intended to get the packet through the HTTP infrastructure, and the server ignores them. The client is free to modify them in the future. Further, note that if the content length is less than or equal to 0×10, this header is considered an echo request, otherwise, it is considered a channel establishment header.

An OUT channel is established by sending an HTTP header, as set forth in the table below:

---

Method: RPC_OUT_DATA
URI: /rpc/rpcproxy.dll?server_name:server_port
Protocol version: HTTP 1.1
Accept: application/rpc
User-Agent: MSRPC
Host: proxy_server
Connection: Keep-Alive
Content-Length: NNN
Cache-control: no-cache
Pragma: no-cache

---

Note that the proxy only looks at the URL query, method and content length; the other fields are simply intended to get the packet through the HTTP infrastructure, and the server ignores them. The client is free to modify them in the future. Further, note that if the content length is less than or equal to 0×10, this header is considered an echo request, otherwise, it is considered a channel establishment header.

The format of the OUT channel response header is set forth below:

---

Response: HTTP/1.1 200 Success
Content-Type: application/rpc
Content-Length: NNN

---

The client is only supposed to look at the code in the response, and not the other header fields, as their purpose is to get through the HTTP infrastructure.

As part of the proxy discovery, the client can send one or more echo packets. A suitable format is:

---

Method: RPC_IN_DATA/RPC_OUT_DATA
URI: /rpc/rpcproxy.dll
Protocol version: HTTP 1.1
Accept: application/rpc
User-Agent: MSRPC
Host: proxy_server
Content-Length: 4
Connection: Keep-Alive
Cache-control: no-cache
Pragma: no-cache
Message Body: 4 bytes chosen by the client.

---

The client uses RPC_IN_DATA/RPC_OUT_DATA if it intends to reuse the connection, as an IN channel or OUT channel, respectively. The proxy should not associate any particular meaning with whether the echo request contains an RPC_IN_DATA or RPC_OUT_DATA verb.

The following describes the echo response:

---

Response: HTTP/1.1 200 Success
Content-Type: application/rpc
Content-Length: 4
Message Body: An empty RTS request with the
RTS_FLAG_ECHO bit set in the flags (described below).

---

The legacy server response is the string "ncacn_http/1.0" sent immediately after the connection is established by the proxy.

The format of the RTS packet is (little-endian, 4 byte aligned structure on the wire; IDL constructs are only for semantic clarity—they do not indicate NDR representation on the wire):

---

```
typedef struct tagChannelSettingCookie
{
    char Cookie[16];
} ChannelSettingCookie;
#define MAX_IPv4_ADDRESS_SIZE 4
#define MAX_IPv6_ADDRESS_SIZE    (16 + 4)    // address + scope_id
typedef enum tagClientAddressType
```

-continued

```
{
    catIPv4 = 0,
    catIPv6
} ClientAddressType;
typedef struct tagChannelSettingClientAddress
{
    // provide enough storage for IPv6 address. Declared in this
    // form to avoid general runtime dependency on transport headers
    // In reality this is SOCKADDR_IN for IPv4 and SOCKADDR_IN6 for
    // IPv6
    ClientAddressType AddressType;
    union
        {
        /*[case(catIPv4)]*/ char IPv4Address[MAX_IPv4_ADDRESS_SIZE];
        /*[case(catIPv6)]*/ char IPv6Address[MAX_IPv6_ADDRESS_SIZE];
        } u;
} ChannelSettingClientAddress;
typedef enum tagForwardDestinations
{
    fdClient = 0,
    fdInProxy,
    fdServer,
    fdOutProxy
} ForwardDestinations;
typedef struct tagFlowControlAck
{
    ULONG BytesReceived;
    ULONG AvailableWindow;
    ChannelSettingCookie ChannelCookie;
} FlowControlAck;
typedef enum tagTunnelSettingsCommandTypes
{
    tsctReceiveWindowSize = 0,      // 0
    tsctFlowControlAck,             // 1
    tsctConnectionTimeout,          // 2
    tsctCookie,                     // 3
    tsctChannelLifetime,            // 4
    tsctClientKeepalive,            // 5
    tsctVersion,                    // 6
    tsctEmpty,                      // 7
    tsctPadding,                    // 8
    tsctNANCE,                      // 9
    tsctANCE,                       // 10
    tsctClientAddress,              // 11
    tsctAssociationGroupId,         // 12
    tsctDestination,                // 13
    tsctPingTrafficSentNotify       // 14
} TunnelSettingsCommandTypes;
typedef struct tagTunnelSettingsCommand
{
    unsigned long CommandType;
    union
        {
        /*[case (tsctReceiveWindowSize)]*/      ULONG ReceiveWindowSize;
        /*[case (tsctFlowControlAck)]*/         FlowControlAck Ack;
        /*[case (tsctConnectionTimeout)]*/      ULONG ConnectionTimeout;
                                                // in milliseconds
        /*[case (tsctCookie)]*/                 ChannelSettingCookie Cookie;
        /*[case (tsctChannelLifetime)]*/        ULONG ChannelLifetime;
        /*[case (tsctClientKeepalive)]*/        ULONG ClientKeepalive;
                                                // in milliseconds
        /*[case (tsctVersion)]*/                ULONG Version;
        /*[case (tsctEmpty)] ; */               // empty - no operands
        /*[case (tsctPadding)] ; */             ULONG ConformanceCount;
                                                // in bytes
        /*[case (tsctNANCE)] ; */    // NANCE - negative acknowledgement
                                     // for new channel
                                     // establishment - no operands
        /*[case (tsctANCE))] ; */               // ANCE - acknowledge new
                                                // channel establishment
        /*[case (tsctClientAddress)]*/
ChannelSettingClientAddress ClientAddress;
        /*[case (tsctAssociationGroupId)]*/     ChannelSettingCookie
AssociationGroupId;
        /*[case (tsctDestination)]*/            ULONG Destination;
                                     // actually one of ForwardDestinations
        /*[case (tsctPingTrafficSentNotify)]*/ ULONG PingTrafficSent;
                                                // in bytes
        } u;
```

-continued

```
} TunnelSettingsCommand;
typedef struct {
    rpcconn_common common;
    unsigned short Flags;
    unsigned short NumberofSettingCommands;
    TunnelSettingsCommand Cmd [1];    // the actual size depends on
                                      // NumberofSettings
} rpcconn_tunnel_settings;
```

The common data members of the RTS packet have the following settings:

```
rpc_vers and rpc_vers_minor are the same as for the
other packets.
PTYPE equals rpc_tunnel_settings (0n20).
pfc_flags have the PFC_FIRST_FRAG and PFC_LAST_FRAG
settings.
drep is indicated little-endian, intel type data
representation (0x10).
frag_length appropriately set for the length of the
fragment
auth_length is 0
call_id is 0
```

This structure of the RTS packet is processed uniformly on any node, which improves efficiency. Note that the RTS packet is not to be encrypted, for one, because it does not need to be encrypted, and encrypting and decrypting reduce efficiency. For another, some RTS packets are produced/consumed on the proxy side, which may not have access to a security context. Note that RTS packets may be inserted between fragments of other RPC traffic, and the various participants need to handle this appropriately.

Flags include the following:

```
#define RTS_FLAG_PING                0x1
#define RTS_FLAG_OTHER_CMD           0x2
#define RTS_FLAG_RECYCLE_CHANNEL     0x4
#define RTS_FLAG_IN_CHANNEL          0x8
#define RTS_FLAG_OUT_CHANNEL         0x10
#define RTS_FLAG_EOF                 0x20
#define RTS_FLAG_ECHO                0x40
```

The RTS_FLAG_PING flag indicates that this is a ping only used as a proof of life, or to flush the pipeline by the other party. Technically, for proof of life this flag is not needed, since any received packet proves life, but it generally is helpful for debugging and simplified packet processing.

The RTS_FLAG_OTHER_CMD flag indicates that the packet contains a stateless command (a command outside of the FIGS. 4-9 below). Client keep alive and flow control commands may use this flag.

The RTS_FLAG_RECYCLE_CHANNEL flag is an indicator that helps streamline processing of some RTS packets associated with channel recycling.

The RTS_FLAG_IN_CHANNEL flag is an indicator that helps streamline processing of some RTS packets associated with IN channel processing.

The RTS_FLAG_OUT_CHANNEL flag is indicator that helps streamline processing of some RTS packets associated with OUT channel processing.

The RTS_FLAG_EOF flag indicates the last packet on a channel, (although not all streams use this to indicate a last packet).

The RTS_FLAG_ECHO flag indicates that this is an echo type of request, and is used during authentication and proxy discovery. The RPC proxy simply bounces back a packet with this flag.

Protocol Operation

Turning to an explanation of the operation of the present invention with particular reference to FIGS. 4-8, as used herein, a message exchange with specific semantics between two or more parties may be referred to as a conversation. In FIGS. 4-8, each conversation has a label (e.g., A, B, C), while the individual messages of a given conversation N will be labeled with a number (e.g., A1, A2, B4 and so on).

There are five major protocol elements, described with reference to FIGS. 4-8. APPENDIX A provides the details of a number of packets that may be used with the present invention, as described below with reference to FIGS. 4-8. In APPENDIX A, each packet is labeled with the corresponding drawing figure, the conversation, and the message number in the conversation, e.g., the FIG. 6/A5 packet is packet A5 in FIG. 6.

Figure 4:
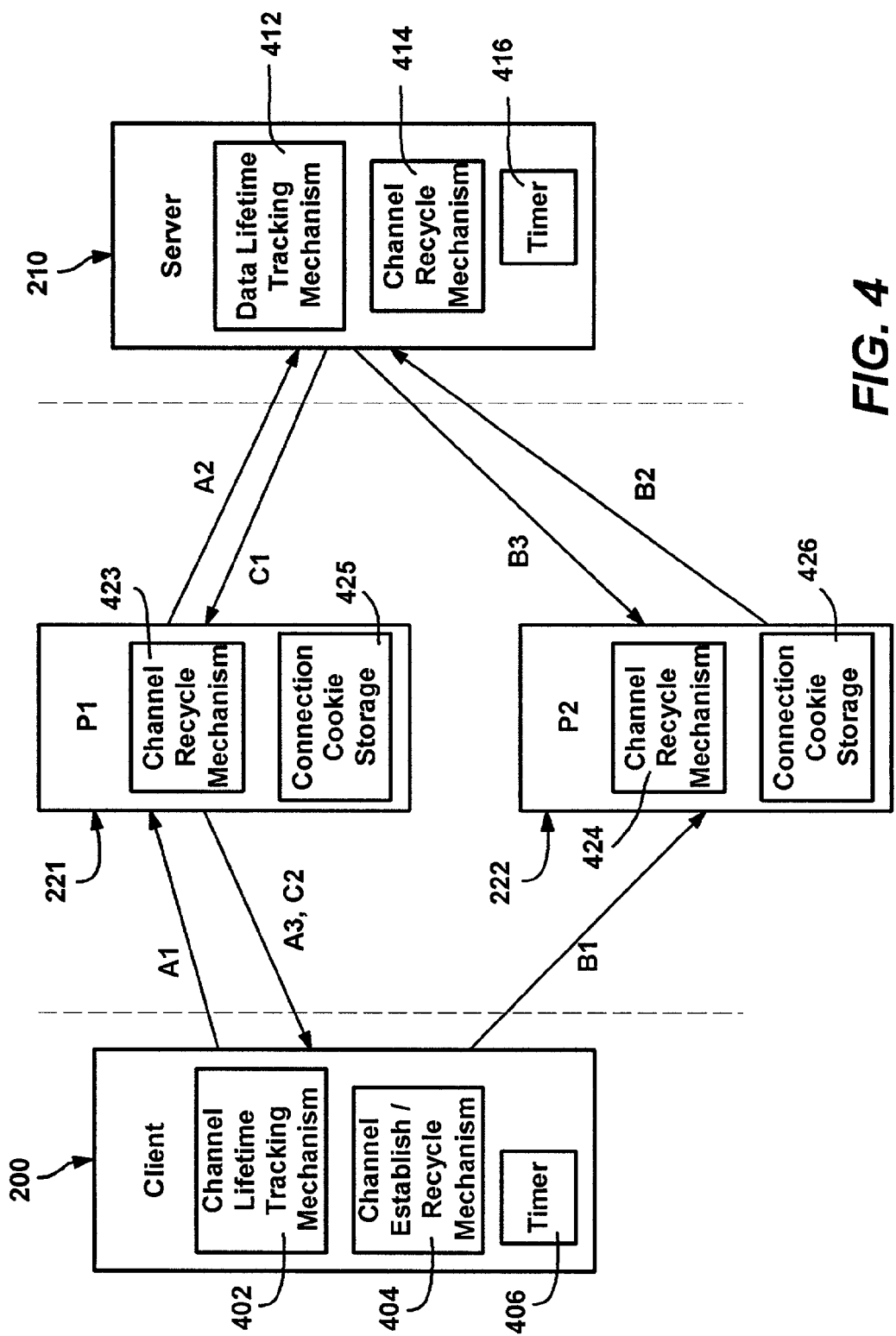
FIG. 4 is a representation of packets sent from a client computer to establish a connection to a server computer via proxies in accordance with an aspect of the present invention.

As represented in FIG. 4, there are three conversations during connection establishment, referred to herein as conversations A, B and C. A and B can proceed in parallel, while C starts only when A and B are ready. Note that the dashed lines in FIG. 4 represent firewalls provided between the proxies 221, 222 (which are typically high-risk machines) and the client 200 and server 210. As also represented in FIG. 4, the client 200 includes a mechanism 402 for tracking the lifetime of the channel, and a mechanism 404 for recycling channels when the lifetime expires (or almost expires). The client also includes one or more timers 406, such as for pinging the channel to keep the connection alive. The server 210 has generally corresponding components 412, 414 and 416. The proxies 221, 222 include channel recycling mechanisms 423 and 424, respectively, and also include an index or the like in which each proxy stores a connection cookie 425 and 426, respectively. As described below, when a channel needs to be recycled, the connection cookie enables a proxy to determine whether it is the same proxy as the proxy of the new channel, which provides for some efficiency. Note that these internal components and the firewall representations are not redundantly represented in FIGS. 5-8.

As represented in FIG. 4, the client 200 establishes a connection to the IN proxy P2 (e.g., the IN proxy P2 of FIG. 2) and to the OUT proxy P1 (e.g., the OUT proxy 221 of FIG. 2). Then, the client 1) sends an IN channel establishment header, 2) sends an OUT channel establishment header, 3) moves to an A3 wait state, 4) sends the FIG. 4/A1 and the FIG. 4/B1 packets and 5) posts receives in both channels. The content length in the IN channel establishment HTTP header needs to agree with the channel lifetime in the FIG. 4/B1 packet, although servers are not required to verify that they agree.

When the OUT proxy P1 receives the OUT channel establishment header, the OUT proxy P1 posts a receive on the OUT channel and waits. When the OUT proxy P1 receives the FIG. 4/A1 packet, the OUT proxy P1 1) moves to C1 wait state, 2) connects to the server 210, 3) sends the OUT channel response header, 4) sends the FIG. 4/A3 packet to the client 200, 5) sends the FIG. 4/A2 packet to the server 210, 6) sets the connection keep alive to the server 210 and 7) posts a receive on its in channel (the server side of the connection). Note that the OUT proxy P1 does not post a receive on the client side of the virtual connection.

When the IN proxy P2 receives the IN channel establishment header, the IN proxy P2 posts a receive on the channel and waits. When the IN proxy P2 receives the FIG. 4/B1 packet, the IN proxy P2 1) moves to a B3 wait state, 2) connects to the server 210, sends the FIG. 4/B2 packet to the server 210, sets the connection keep alive to the server 210 and posts a receive on its in channel (the client side of the connection). Note that the IN proxy P2 does not post receive on the server side of the virtual connection. Also, any data packets received before the FIG. 4/B3 packet will be queued.

Note that FIG. 4/B2 does not contain the channel lifetime, because for an IN channel, the server 210 does not care about the lifetime. Also note that since P1 and P2 may not be the same machine, (e.g., in a web farm), P2 cannot send its initial receive window size and connection timeout to the client 200 directly. Therefore P2 uses the server 210 to bounce the RTS packet on the out channel.

When the server 210 receives the FIG. 4/A2 packet, the server 210 checks the FIG. 4/B2 packet to determine whether the given connection cookie has arrived, and if not, moves the connection to state B2 wait, posts a receive on the OUT channel and sets up a fifteen minute timer. If the timer expires without receiving the FIG. 4/B2 packet, the connection will be aborted. If the FIG. 4/B2 packet has been received for the given connection cookie and the FIG. 4/A2 packet arrives second, the server 210 will 1) cancel the timer set by the FIG. 4/B2 packet, 2) move to a state of "Opened," 3) post a receive on the OUT channel and 4) send the FIG. 4/C1 packet and the FIG. 4/B3 packet.

Similarly, when the server 210 receives the FIG. 4/B2 packet, it checks if the FIG. 4/A2 packet for the given connection cookie has arrived, and if not, moves the connection to an A2 wait state, posts a receive on the IN channel P2 and sets up a fifteen minute timer. If the timer expires without receiving the FIG. 4/A2 packet, the connection will be aborted. If the FIG. 4/A2 packet has been received for the given connection cookie and the FIG. 4/B2 packet arrives second, the server 210 will 1) cancel the timer set by the FIG. 4/A2 packet, 2) move to a state of Opened, 3) post a receive on the IN channel and 4) send the FIG. 4/C1 packet and the FIG. 4/B3 packet.

When the IN proxy P2 receives the FIG. 4/B3 packet, the IN proxy P2 moves to state Opened, and flushes the data packet queue it kept until the arrival of the FIG. 4/B3 packet, in accordance with flow control policies. Before receiving the FIG. 4/B3 packet, the IN proxy P2 may receive the legacy server response, but ignores it.

When the OUT proxy P1 receives the FIG. 4/C1 packet, the OUT proxy P1 moves to the Opened state, sends the FIG. 4/C2 packet to client 200 and posts another receive on the server side of its connection.

When the client 200 gets the FIG. 4/A3 packet, it moves to state C1 wait and posts another receive on the OUT channel. When the client 200 receives the FIG. 4/C2 packet, the client 200 posts another receive on its OUT channel, and sets both channel states to opened.

In accordance with one aspect of the present invention, once a virtual connection is established, the client 200 sends RPC data to the server 210 via the IN channel, and the server 210 replies by sending the RPC data on the OUT channel. The proxies faithfully transfer the data back and forth. Special conditions that are handled include channel expiration, flow control, pings and keep alives, as generally described above, and as further described in the examples below.

As described above, the lifetime of a channel is not infinite, and thus to provide a virtual channel with an essentially infinite lifetime, once a channel expires, the channel is replaced. This process is called channel recycling. IN channels and OUT channels are replaced using slightly different mechanisms, as described below, although some rules apply to both cases and are described together at this time.

Figure 9:
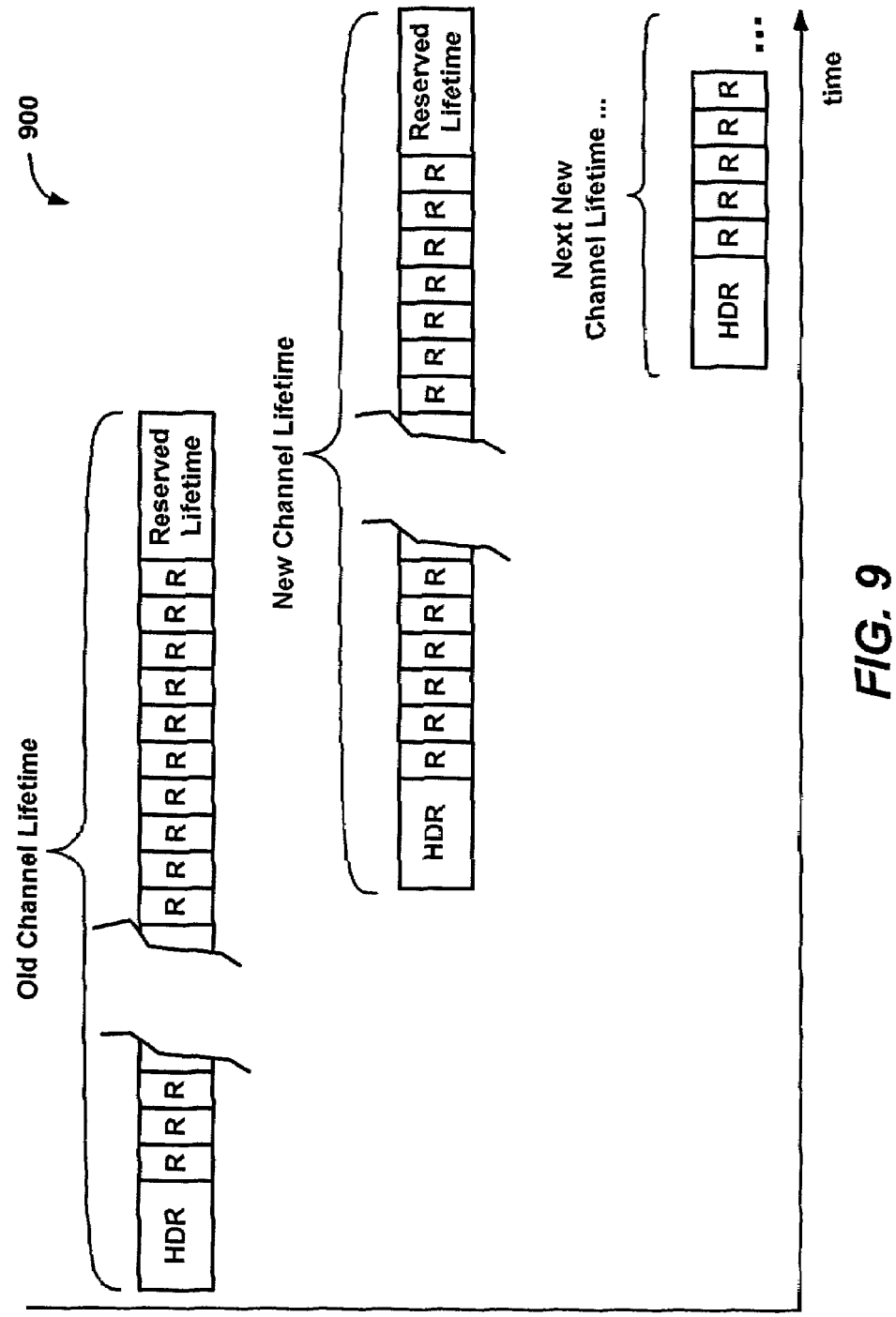
FIG. 9 is a representation of one suitable way to time the recycling of channels, in accordance with an aspect of the present invention.

For example, a channel is not to send non-RTS data on the last remaining bytes of its lifetime, e.g., the last four kilobytes for the client 200, or the last eight kilobytes for the server 210. These remaining bytes are referred to as the reserved lifetime, as generally represented in the virtual channel 900 of FIG. 9, where "HDR" represents the headers, and R represents the RPC (or RTS) requests (which need not be the same size). A channel can only use the reserved lifetime for RTS traffic, and if data traffic is requested by the runtime during the reserved lifetime and a replacement channel is not yet established, the transport queues the runtime data for later transmission on the new channel, as described below. This is because the reserved lifetime is needed for the re-establishment of the channel, in other words, for handshaking. Note that as generally represented in FIG. 9, the party (client or server) that initiates the channel recycling is free to establish a new channel before the old channel reaches its reserved lifetime, to avoid traffic interruptions due to network latency. However, if a new channel is established before the old one has expired, the new channel is used for further traffic, and the old one closed, as generally described below.

Since both the IN channel and the OUT channel never use the reserved lifetime for data, both channels can be replaced at the same time. Note that if an old channel's connection is about to timeout before the new channel is fully established, the sending party needs to send pings on the old channel to keep it alive.

Figure 5:
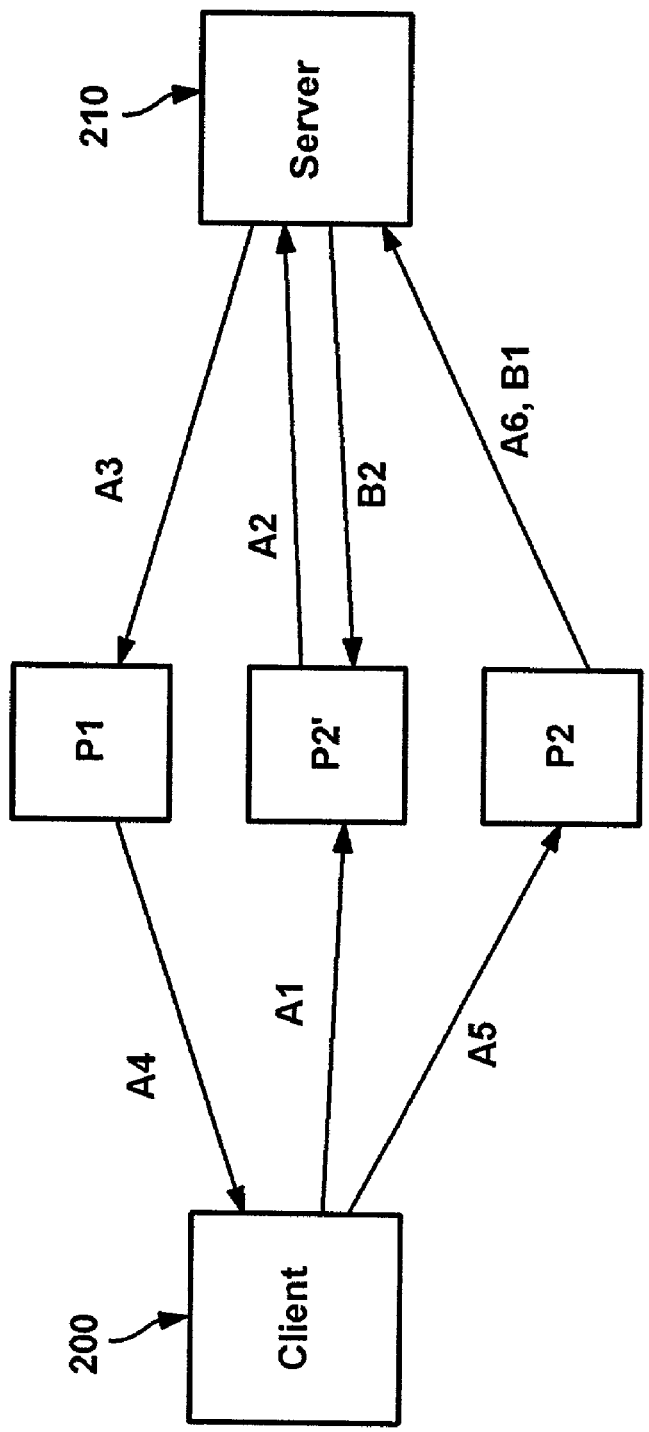
FIG. 5 is a representation of the operation of a recycling protocol for recycling an IN channel, in accordance with an aspect of the present invention.

In general, recycling of the IN channel depends on the identity of P2 (the old IN channel) and P2' (the new IN channel). FIG. 5 shows the recycling operation when P2 is not the same as P2.

As generally represented in FIG. 5, when the client 200 decides to recycle the IN channel, the client 1) establishes a connection to the P2' proxy, 2) sends IN channel establishment header, 3) moves the IN channel state to Opened A4 wait state, 4) sends the FIG. 5/A1 packet and 5) posts another receive on the in channel.

When P2' receives the FIG. 5/A1 packet, the P2' proxy looks for this connection cookie in its index. If it finds one, it conforms to the protocol described below with reference to FIG. 6. In actuality, during the sending of the FIG. 5/A1 packet or the FIG. 6/A1 packet, the client does not know whether it will use the FIG. 5 or FIG. 6 protocol, but instead finds out when it receives the FIG. 5/A4 packet or the FIG. 6/A4 packet. If P2' does not find a connection with this cookie, it conforms to the FIG. 5 protocol. In such case, the proxy P2' 1) connects to the server, 2) sends the FIG. 5/A2 packet, 3) sets the connection to keep-alive on the server end of the connection and 4) posts another receive on the client side of the connection.

When the server 210 gets the FIG. 5/A2 packet, the server 1) verifies that it can find a connection with such a cookie, 2)

verifies that the old channel cookie matches the cookie the server 210 has, 3) sets a fifteen minute timeout timer, 4) moves to an A6 wait state, 5) posts another receive on the IN channel and 6) sends the FIG. 5/A3 packet to P1. If the timer expires before the server 210 gets the FIG. 5/A6 packet, the server 210 aborts the connection.

The OUT proxy P1 simply forwards the packet to the client as the FIG. 5/A4 packet, without looking at it.

When the client 200 receives the FIG. 5/A4 packet, the client 1) posts a receive on the OUT channel, 2) switches the default IN channel (the new IN channel still only queues data), 3) drains request submissions on the old IN channel, 4) gets any buffers queued at the old IN channel (because as described above, if the channel lifetime expires, the channel will queue packets), 5) puts the buffer contents to the front of the new IN channel data queue, 6) moves the channel to state Opened, 7) waits for all sends pending to the old IN proxy P2 to go on the wire, and then 8) sends the FIG. 5/A5 packet. Then the client 200 allows sends on the new IN channel. Note that the client still has a pending receive on the old IN channel. The client is also free to no longer ping the proxy, meaning that the connection may eventually timeout, and the old proxy P2 does not treat this as an error.

When the old IN proxy P2 gets the FIG. 5/A5 packet, the old IN proxy P2 1) forwards the FIG. 5/A5 packet as the FIG. 5/A6 packet to the server, 2) waits for all sends that were queued to go on the wire, and then 3) sends the FIG. 5/B1 to the server. The proxy also has a pending receive on the server side of the connection.

When the server 210 receives the FIG. 5/A6 packet, the server 210 cancels the timer set up with the FIG. 5/A2 packet and moves to an Opened B1 wait state. When the server 210 receives the FIG. 5/B1 packet, the server 1) checks that it is in B1 wait state, 2) switches the default IN channel, 3) transfers the receive state from the old IN channel to the new IN channel, 4) sends the FIG. 5/B2 to the new in proxy, 5) closes the connection to the old IN proxy, and 6) moves to a state of Opened. The old IN proxy P2 detects the close, and closes the client side of its connection. The client 200 detects this close, and discards the old IN channel.

When the new IN proxy receives the FIG. 5/B2 packet, the new IN proxy starts sending traffic to the server 210.

If the old proxy P2 is the same as the new proxy P2', then P2 (which equals P2' and is thus referred to hereinafter as simply P2) will use a slightly different protocol, that takes advantage of the proxy being the same to perform some optimizations, e.g., an unchanged P2 will not open a new connection to server, and will continue to use the old channel flow control.

Figure 6:
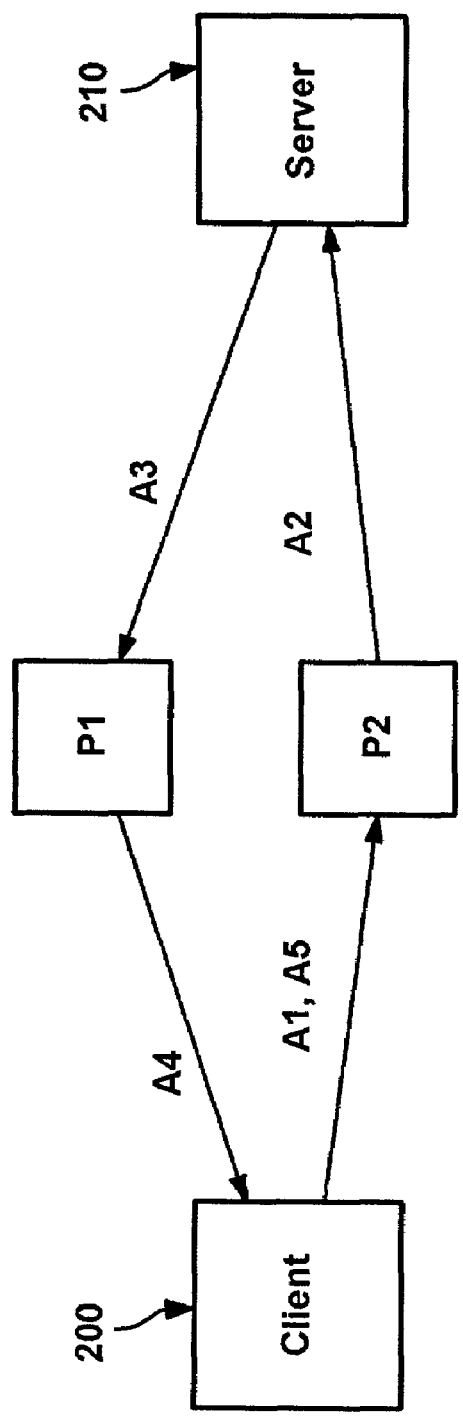
FIG. 6 is a representation of the operation of a recycling protocol for recycling an IN channel when IN channel proxies are the same, in accordance with an aspect of the present invention.

FIG. 6 generally represents this situation. In FIG. 6, when the client 200 has decided to recycle the IN channel, the client 1) establishes a connection to the P2 proxy, 2) sends an IN channel establishment header, 3) moves the IN channel state to Opened_A4 wait state, 4) sends the FIG. 6/A1 packet packet and 5) posts another receive on the IN channel.

When the IN proxy P2 receives the FIG. 6/A1 packet, the IN proxy P2 looks for this connection cookie in its index. If not found, the IN proxy P2 will conform to the FIG. 5 protocol, described above.

In actuality, during the sending of the FIG. 5/A1 packet or the FIG. 6/A1 packet, the client 200 does not know whether it will use the FIG. 5 or FIG. 6 protocol, but instead finds out when it receives the FIG. 5/A4 packet or the FIG. 6/A4 packet. If P2 does find a connection with this cookie, it conforms to this protocol.

More particularly, when the IN proxy P2 gets the FIG. 6/A1 packet, the IN proxy P2 1) sets up a fifteen minute timeout timer, 2) moves to state Opened A5 wait, 3) sends the FIG. 6/A2 packet to the server and 4) posts another receive on the client side of the connection. Any data packets it receives are queued instead of being sent, until the FIG. 6/A5 packet is received.

When the server 210 receives the FIG. 6/A2 packet, the server 210 updates its cookie, sends the FIG. 6/A3 packet on OUT channel and posts another receive on the IN channel. The OUT proxy P1 does not look at the FIG. 6/A3 packet, but simply forwards it as the FIG. 6/A4 packet to the client.

When the client 200 receives the FIG. 6/A4 packet, the client 1) posts a receive on the OUT channel, 2) switches the default IN channel (the new IN channel still only queues data), 3) drains request submissions on the old IN channel, 4) gets any buffers queued at the old IN channel, 5) puts them in front of the new IN channel data queue, 6) moves the channel to state Opened, 7) waits for all sends pending to the old IN proxy to go on the wire, and then 8) sends the FIG. 6/A5 packet. The client 200 then allows sends on the new IN channel. Note that the client 200 still has a pending receive on the old IN channel. The client is also free to no longer ping the proxy, meaning that eventually the connection may timeout, and the proxy does not treat this as an error.

When the IN proxy P2 gets the FIG. 6/A5 packet, the IN proxy P2 1) verifies that the cookies match, 2) switches the default IN channel, 3) sends all queued packets (subject to flow control restrictions), 4) moves to state opened, and 5) closes the old IN channel. The client detects the close and closes its end of the old IN channel.

The method by which the OUT channel is recycled depends on the identity of P1 (the old OUT channel) and P1' (the new OUT channel). If P1 is not the same as P1', the recycling protocol is that generally described with reference to FIG. 7, else if the same, the recycling protocol is that generally described with reference to FIG. 8.

Figure 7:
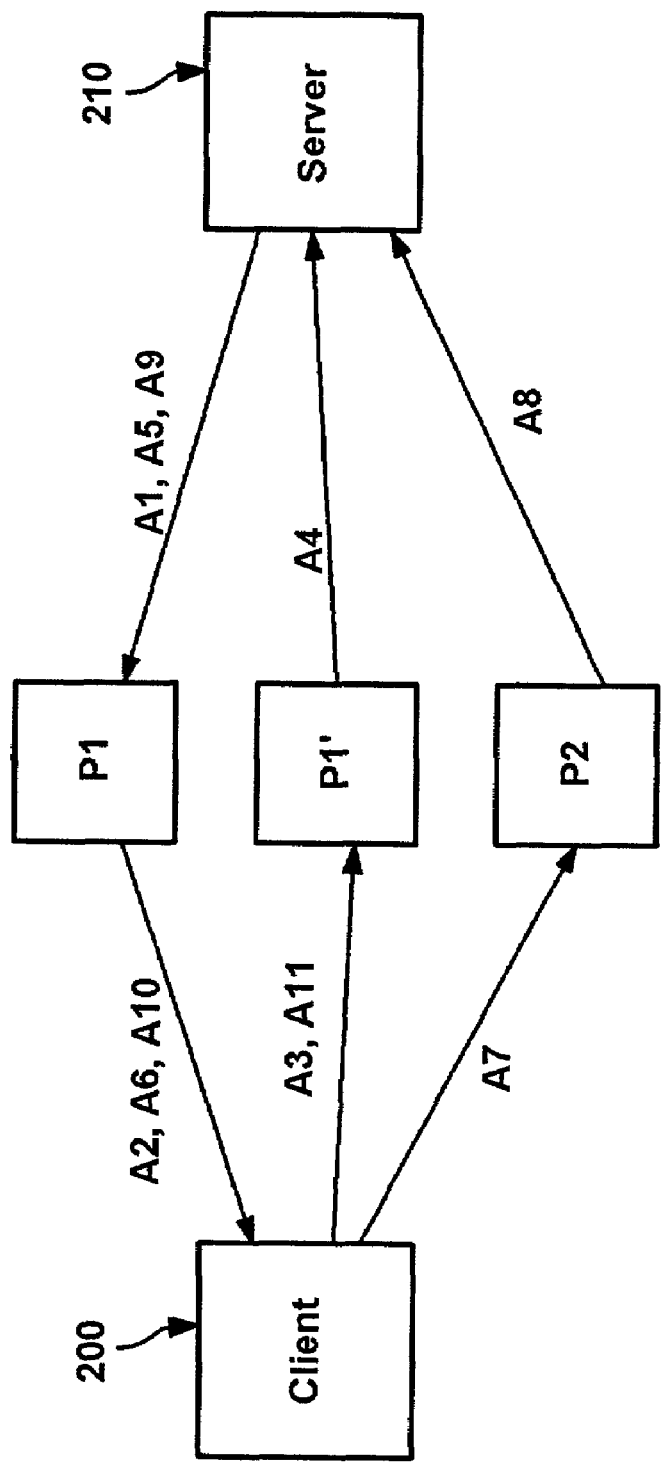
FIG. 7 is a representation of the operation of a recycling protocol for recycling an OUT channel, in accordance with an aspect of the present invention.

When the server 210 decides it needs to recycle the channel, it moves to state Opened A4 wait and sends the FIG. 7/A1 packet. The old OUT proxy P1 forwards the FIG. 7/A1 packet as the FIG. 7/A2 packet, and need not even look at it.

When the client 200 receives the FIG. 7/A2 packet, the client 1) connects to the new proxy P1', 2) sends a connection establishment header, 3) moves to an Opened A6 wait state, 4) sends the FIG. 7/A3 packet and then 5) posts receive on the old OUT channel.

When the old proxy P1 gets the FIG. 7/A3 packet, the proxy P1 looks for a connection with the same cookie. If the proxy P1 does not find one, the proxy P1 conforms to this (FIG. 7) recycling protocol. If instead the proxy P1 it finds one that matches, it conforms to protocol described below with reference to FIG. 8. Note that throughout the A1, A2, and A3 packets, neither the server 210 nor the client 200 know whether the old proxy P1 is the same as the new proxy P1' and thus whether the FIG. 7 recycling protocol or the FIG. 8 recycling protocol will be used. The decision is made by the OUT proxy P1 at this step.

When the proxy finds out that it is to conform to the FIG. 7 recycling protocol, it 1) moves to state A11 wait, 2) connects to the server 210, 3) sends the FIG. 7/A4 packet to the server and 4) posts a receive on the server side of its connection.

When the server 210 processes the FIG. 7/A4 packet, the server 210 moves the OUT channel state to Opened A8 wait, posts another receive on the new OUT channel and sends the FIG. 7/A5 packet on the old OUT channel. The old OUT proxy need not look at the FIG. 7/A5 packet, just forward it as the FIG. 7/A6 packet.

When the client 200 processes the FIG. 7/A6 packet, the client moves to the Opened A10 wait state, sends the FIG. 7/A7 packet on the IN channel, and posts another receive on the old out channel. The IN proxy does not look at the FIG. 7/A7 packet but merely forwards it as the FIG. 7/A8 packet to the server.

When the server gets the FIG. 7/A8 packet, the server 1) moves to Opened state, 2) switches the default OUT channel, 3) drains all the pending submissions on the old OUT channel, 4) gets all packets queued on the old OUT channel and puts them at the front of the queue on the new OUT channel (as the new out channel is still only queuing and is not sending yet), 5) sends the FIG. 7/A9 packet on the old OUT channel after all other packets have been sent on the FIG. 7/A9 packet, and 6) starts sending on the new OUT channel.

When the old OUT proxy gets the FIG. 7/A9 packet, it waits for all other queued packets to be sent to the client, and then it sends the FIG. 7/A10 packet. After it sends the FIG. 7/A10 packet, it closes both ends of the connection. This causes both the server and the client to close their respective ends.

When the client gets the FIG. 7/A10 packet, it blocks all data receives on the new OUT channel, switches the default OUT channel, drains pending submissions on the old OUT channel, sends the FIG. 7/A11 packet to the new OUT channel, posts a receive on the new OUT channel, transfers the receives from the old OUT channel to the new OUT channel, and moves to state Opened. When the proxy gets the FIG. 7/A11 packet, it sends an OUT channel response header and then starts sending data.

Figure 8:
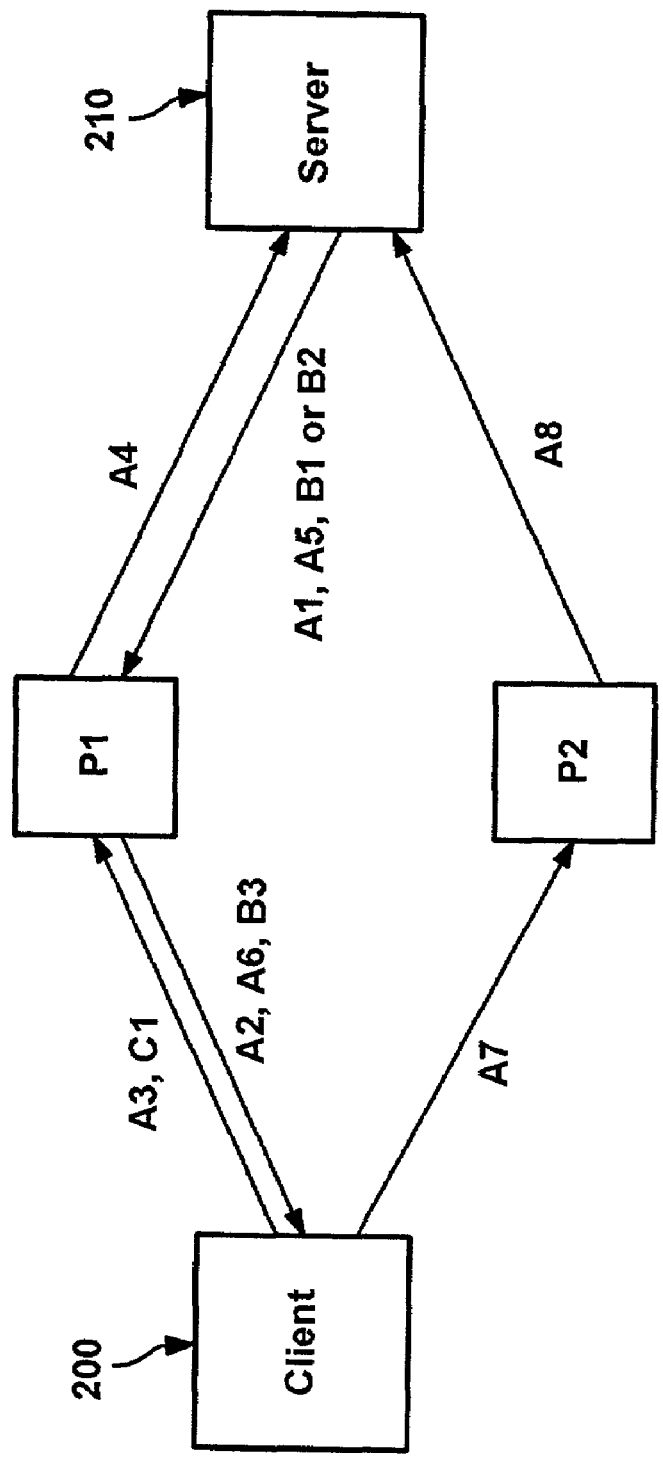
FIG. 8 is a representation of the operation of a recycling protocol for recycling an OUT channel when OUT channel proxies are the same, in accordance with an aspect of the present invention.

In the situation where the old OUT Proxy P1 is the same as the new OUT proxy P1', a slightly more-optimized recycling protocol is used, in which the connection from the proxy to the server is not re-established, as generally represented in FIG. 8, described below.

To this end, as represented in FIG. 7, when the server 210 decides it needs to recycle the OUT channel, the server 210 moves to state Opened A4 wait and sends the FIG. 7/A1 packet. The OUT proxy P1 forwards the FIG. 7/A1 packet as the FIG. 7/A2 packet, without even needing to look at it.

When the client 202 receives the FIG. 7/A2 packet, the client 1) connects to P1', 2) sends a connection establishment header, 3) moves to state Opened A6 wait, 4) sends the FIG. 7/A3 packet and then 5) posts a receive on the out channel.

In turn, when the proxy processes the FIG. 7/A3 packet, it looks for a connection with the same cookie. If it does find one, it conforms to the recycling protocol of FIG. 7. If the prxoy does not find one, it instead conforms to the recycling protocol of FIG. 8. Note that as described above, throughout the A1, A2, and A3 packets, neither the server 210 nor the client 200 know whether the old and new OUT proxies (P1 and P1', respectively) are the same or different, and thus do not know whether the recycling protocol of FIG. 7 or FIG. 8 will be used. The decision is made by the OUT proxy at this step.

An old OUT proxy P1 that discovers that it is the same as the new OUT proxy (P1' which is also P1) follows the recycling protocol described with reference to FIG. 8, and 1) posts another receive on the new OUT channel, 2) moves to state B1 wait, 3) connects to the server and 4) sends the FIG. 8/A4 packet to the server.

When the server 210 gets the FIG. 8/A4 packet, the server 1) moves to an Opened A8 wait state, 2) sets up a fifteen minute timeout, 3) sends the FIG. 8/A5 packet on the OUT channel and 4) posts another receive on the OUT channel. If the timeout interval is achieved without the server receiving the FIG. 8/A8 packet, the connection is aborted.

The OUT proxy P1 forwards the FIG. 8/A5 packet to the client 200 as the FIG. 8/A6 packet without looking at it. When the client 200 gets the FIG. 8/A6 packet, the client 1) moves to state B3 wait, 2) sends the FIG. 8/C1 on the new OUT channel, 3) sends the FIG. 8/A7 packet on the IN channel and 4) posts another receive on the OUT channel.

The IN proxy P2 forwards the FIG. 8/A7 packet as the FIG. 8/A8 packet to the server 210, without needing to look at it. When the server 210 gets the FIG. 8/A8 packet, the server cancels the timeout it previously set (when it received the FIG. 8/A4 packet) and sends the FIG. 8/B1 packet or the FIG. 8/B2 packet, depending on whether the cookies matched.

If the proxy P1 receives the FIG. 8/B1 packet, the proxy P1) switches the default OUT channel, 2) sends all packets it has on the old OUT channel, 3) sends the FIG. 8/B3 packet on the old OUT channel, 4) closes the old OUT channel, 5) moves the state to Opened, 6) sends an OUT channel response header, and then 7) posts another receive on the server side of the connection.

If the proxy P1 gets the FIG. 8/B2 packet, it aborts and discards the new OUT channel.

When the client 200 receives and processes the FIG. 8/B3 packet, the client 1) blocks data receives on the new OUT channel, 2) switches the default OUT channel, 3) drains pending submissions on the old OUT channel, 4) posts a receive on the new OUT channel and 5) transfers the receives from the old OUT channel to the new OUT channel and moves to state Opened.

In this manner, HTTP connections may be established, and thereafter used for bi-directional RPC communication. As these channels expire, a recycling process efficiently replaces the channels, providing a virtual IN channel and virtual OUT channel that form a virtual bidirectional connection that never expires. Also, pings keep the virtual channels alive when necessary, so that data streams with intermittent usage patterns do not result in the connection being dropped.

As can be seen from the foregoing detailed description, there is provided a method and system that layers/maps an essentially infinite request/reply data stream such as to carry RPC traffic, onto finite, unidirectional and time-limited request/replies, such with as HTTP. The method and system are extensible and flexible, may be varied and/or otherwise customized to work with other transport protocols and in other scenarios, and provide numerous advantages over prior art mechanisms.

While the invention is susceptible to various modifications and alternative constructions, certain illustrated embodiments thereof are shown in the drawings and have been described above in detail. It should be understood, however, that there is no intention to limit the invention to the specific form or forms disclosed, but on the contrary, the intention is to cover all modifications, alternative constructions, and equivalents falling within the spirit and scope of the invention.

What is claimed is:

1. In a computer network having a client and a server, a method comprising:
   establishing an IN channel for client-to-server traffic, the IN channel having a lifetime that expires and wherein the IN channel complies with a hypertext transfer protocol;
   establishing an OUT channel for server-to-client traffic, the OUT channel having a lifetime that expires and wherein the OUT channel complies with the hypertext transfer protocol;
   communicating data from the client to the server via the IN channel;
   communicating data from the server to the client on the OUT channel;

prior to the expiration of the IN channel, establishing a new IN channel, wherein the new IN channel complies with the hypertext transfer protocol, wherein the expiration of the IN channel is determined by counting a size of request data sent from the client to the server with respect to the lifetime of the IN channel; and prior to the expiration of the OUT channel, establishing a new OUT channel, wherein the new OUT channel complies with the hypertext transfer protocol, wherein the expiration of the OUT channel is determined by counting a size of data sent from the server to the client with respect to the lifetime of the OUT channel, and wherein the establishing of the new IN channel and the new OUT channel recycle the established IN channel and OUT channel to provide a virtual connection between the client and the server having a lifetime that does not expire.

2. The method of claim 1 wherein the IN channel corresponds to an IN proxy, and wherein establishing the IN channel for client-to-server traffic includes sending a header from the client to the IN proxy.

3. The method of claim 2 wherein the IN proxy receives the header, and in response connects to the server.

4. The method of claim 1 wherein the OUT channel corresponds to an OUT proxy, and wherein establishing the OUT channel for client-to-server traffic includes sending a header from the client to the OUT proxy.

5. The method of claim 4 wherein the OUT proxy receives the header, and in response connects to the server.

6. The method of claim 1 further comprising:
communicating some data over a channel detected not to have data communicated thereon for a defined period.

7. The method of claim 1 wherein the IN channel has an IN-channel reserved lifetime, and the OUT channel has an OUT-channel reserved lifetime, the method further comprising:
when data reaches the IN-channel reserved lifetime on the IN channel, begin establishing the new IN channel; and
when data reaches the OUT-channel reserved lifetime on the OUT channel, begin establishing the new OUT channel.

8. The method of claim 1 wherein the IN channel corresponds to an IN proxy and the OUT channel corresponds to an OUT proxy, and wherein the OUT proxy and the IN proxy each provides a receive window for flow control.

9. The method of claim 8 wherein the IN proxy provides a receive window for flow control, wherein the new IN proxy continues to use the receive window flow control from the IN proxy in response to identifying that the IN proxy is the same as the new IN proxy.

10. The method of claim 1 wherein the IN channel corresponds to an IN proxy, and further comprising: providing a new IN proxy upon establishing the new IN channel.

11. The method of claim 1 wherein the OUT channel corresponds to an OUT proxy, and further comprising: providing a new OUT proxy upon establishing the new OUT channel.

12. The method of claim 11 wherein the OUT proxy provides a receive window for flow control, wherein the new OUT proxy continues to use the receive window flow control from the OUT proxy in response to identifying that the OUT proxy is the same as the new OUT proxy.

13. The method of claim 1 wherein the data communicated over the IN channel and the OUT channel comprise RPC data over HTTP.

14. In a computer network having a client and a server, a method comprising:

receiving, at a first proxy, a request from a client to establish an OUT channel for server-to-client traffic, and in response, establishing a connection with the server as the OUT channel, wherein the OUT channel complies with a hypertext transfer protocol;

receiving, at a second proxy, a request from a client to establish an IN channel for client-to-server traffic, and in response, establishing a connection with the server as the IN channel, wherein the IN channel complies with the hypertext transfer protocol;

at the second proxy via the IN channel, receiving data from the client directed to the server and forwarding it to the server;

at the first proxy via the OUT channel, receiving data from the server directed to the client and forwarding it to the client;

receiving at the first proxy a request from the server to recycle the OUT channel to a new OUT channel corresponding to a third proxy, and in response, transitioning server-to-client traffic to the new OUT channel, wherein the new OUT channel complies with the hypertext transfer protocol, and wherein the request from the server to recycle the OUT channel is generated before expiration of the OUT channel, wherein the expiration is determined by counting a size of request data sent from the server to the client; and receiving at the second proxy a request from the client to recycle the IN channel to a new IN channel corresponding to a fourth proxy, and in response, transitioning client-to-server traffic to the new IN channel, wherein the new IN channel complies with the hypertext transfer protocol, and wherein the request from the client to recycle the IN channel is generated before expiration of the IN channel, wherein the expiration is determined by counting a size of data sent from the client to the server.

15. The method of claim 14 further comprising, detecting whether the first proxy and the third proxy are the same.

16. The method of claim 15 wherein the third proxy detects whether the first proxy and the third proxy are the same by comparing a received connection cookie to a stored connection cookie.

17. The method of claim 15 wherein the fourth proxy detects whether the second proxy and the fourth proxy are the same by comparing a received connection cookie to a stored connection cookie.

18. The method of claim 14 further comprising, detecting whether the second proxy and the fourth proxy are the same.

19. The method of claim 14 wherein transitioning server-to-client traffic to the new OUT channel comprises providing data queued at the first proxy to the third proxy.

20. The method of claim 14 wherein transitioning server-to-client traffic to the new IN channel comprises providing data queued at the second proxy to the fourth proxy.

21. A method of creating a bi-directional virtual channel for transporting RPC information between a client and a server comprising:

establishing a first HTTP IN channel having a predetermined lifetime, wherein the first HTTP IN channel automatically expires upon reaching the predetermined lifetime and wherein the first HTTP IN channel transports a first portion of RPC information from the client to the server; and prior to expiration of the first HTTP IN channel, recycling the IN channel by establishing a second HTTP IN channel, the second HTTP IN channel transports a second portion of RPC information from the client to the server following expiration of the first HTTP IN channel, wherein the expiration of the first HTTP IN channel is determined by counting the size of the request data sent to the server with respect to the predetermined lifetime of the first HTTP IN channel.

22. The method as defined in claim 21 further comprising: establishing a first HTTP OUT channel having an associated predetermined lifetime, wherein the first HTTP OUT channel automatically expires upon reaching the predetermined lifetime and wherein the first HTTP OUT channel transports a third portion of RPC information from the server to the client; and prior to expiration of the first HTTP OUT channel, establishing a second HTTP OUT channel, the second HTTP OUT channel transports a fourth portion of RPC information from the server to the client following expiration of the first HTTP OUT channel.

* * * * *